United States Patent
Kitanovski et al.

(10) Patent No.: US 7,481,064 B2
(45) Date of Patent: Jan. 27, 2009

(54) METHOD AND DEVICE FOR CONTINUOUS GENERATION OF COLD AND HEAT BY MEANS OF THE MAGNETO-CALORIFIC EFFECT

(75) Inventors: Andrej Kitanovski, Ljubljana (SI); Peter Williams Egolf, Niederlenz (CH); Osmann Sari, Prilly (CH)

(73) Assignee: Haute Ecole d'Ingenierie et de Gestion du Canton de Vaud (Heig-VD), Yverdon-les-Bains (CH)

( * ) Notice: Subject to any disclaimer, the term of this patent is extended or adjusted under 35 U.S.C. 154(b) by 514 days.

(21) Appl. No.: 10/540,079

(22) PCT Filed: Dec. 22, 2003

(86) PCT No.: PCT/CH03/00839

§ 371 (c)(1),
(2), (4) Date: Aug. 16, 2005

(87) PCT Pub. No.: WO2004/059221

PCT Pub. Date: Jul. 15, 2004

(65) Prior Publication Data

US 2007/0144181 A1   Jun. 28, 2007

(30) Foreign Application Priority Data

Dec. 24, 2002   (CH) ................................ 2211/02

(51) Int. Cl.
*F25B 21/00* (2006.01)
(52) U.S. Cl. ........................................ 62/3.1
(58) Field of Classification Search ............. 62/3.1
See application file for complete search history.

(56) References Cited

U.S. PATENT DOCUMENTS 3,108,444 A   10/1963   Kahn (Continued)

FOREIGN PATENT DOCUMENTS

| FR | 2 525 748 | 10/1983 |
|----|-----------|---------|
| FR | 2 586 793 | 3/1987  |
| JP | 2002356748 | 12/2002 |

OTHER PUBLICATIONS

Pecharsky V K et al: "Effect of alloying on the giant magnetocaloric effect of Gd5 (Si2Ge2)", Journal of Magnetism and Magnetic Materials, Elsevier Science Publishers, Amsterdam, NL, vol. 167, No. 3, Mar. 1, 1997, pp. 1179-1184, XP004092344 ISSN: 0304-9953 figures 4,5 p. L183, paragraph 2—p. L184, paragraph 1.

(Continued)

*Primary Examiner*—William C Doerrler
(74) *Attorney, Agent, or Firm*—Davis & Bujold P.L.L.C.

(57) ABSTRACT

The device (10) for continuous generation of cold and heat by the magneto-calorific effect, comprises a chamber (11), divided into two adjacent compartments (12, 13), separated by a wall (14). The chamber (11) contains a rotating element (15) made from at least one magneto-calorific material, a first circuit (17a) with a first heat exchange fluid circulating therein and a second circuit (17b) with a second heat exchange fluid circulating therein. The chamber (11) is connected to magnetic device (16) for generating a magnetic field in the region of the compartment (12) in which the rotating element (15) is located. When the above is set in rotation the part thereof located in the first compartment (12) is magnetized upon undergoing an increase in temperature. On passing into the second compartment (13), the part is demagnetized upon undergoing a cooling. The heat and the cold thus generated are transmitted by the heat exchange fluids respectively to user circuits for heat (19) and cold (22) for recovery and use for ulterior purposes.

20 Claims, 8 Drawing Sheets

U.S. PATENT DOCUMENTS

| | | | |
|---|---|---|---|
| 4,408,463 A * | 10/1983 | Barclay | 62/3.1 |
| 4,625,519 A * | 12/1986 | Hakuraku et al. | 62/3.1 |
| 4,674,288 A | 6/1987 | Kuriyama et al. | |
| 4,727,721 A * | 3/1988 | Peschka et al. | 62/3.1 |
| 4,727,722 A * | 3/1988 | Kirol | 62/3.1 |
| 4,970,866 A | 11/1990 | Mokadam | |
| 5,091,361 A * | 2/1992 | Hed | 505/163 |
| 5,231,834 A | 8/1993 | Burnett | |
| 6,221,275 B1 | 4/2001 | Choi et al. | |
| 6,526,759 B2 * | 3/2003 | Zimm et al. | 62/3.1 |
| 6,595,004 B1 * | 7/2003 | Ghoshal | 62/3.1 |
| 6,668,560 B2 * | 12/2003 | Zimm et al. | 62/3.1 |
| 2002/0040583 A1 * | 4/2002 | Barclay et al. | 62/3.1 |

OTHER PUBLICATIONS

Bohigas E et al: "Room-Temperature Magnetic Refrigerator Using Permanent Magnets" IEEE Transactions on Magnetics, IEEE Inc. New York, US, vol. 36, No. 3, May 2000, pp. 538-544, XP000951784 ISSN: 0018-9464 figure 9 p. 542, column 2, paragraph 2—p. 543, column 1, paragraph 2.

* cited by examiner

METHOD AND DEVICE FOR CONTINUOUS GENERATION OF COLD AND HEAT BY MEANS OF THE MAGNETO-CALORIFIC EFFECT

This application is a National Stage completion of PCT/CH2003/000839 filed Dec. 22, 2003 which claim priority from Swiss application Ser. No. 2211/02 filed Dec. 24, 2002.

TECHNICAL DOMAIN

The present invention concerns a method for continuous generation of cold and heat by means of the magneto-calorific effect using at least one heat exchanger.

It further concerns a device for continuous generation of cold and heat by means of the magneto-calorific effect comprising at least one heat exchanger.

PRIOR ART

Conventional cold generating devices usually comprise a compressor which compresses a refrigerant in order to raise its temperature and a detainment means to decompress said refrigerant in order to cool it adiabatically. Refrigerants in current use have proven to be extremely polluting and their use entails considerable atmospheric pollution. Because of this, these refrigerants no longer meet current environmental protection requirements.

Devices using the magneto-calorific effect to generate cold are already known in the art. In particular, U.S. Pat. No. 4,674,288 describes a helium liquefaction device comprising a magnetizable substance moving within a magnetic field generated by a coil and a helium reservoir that is in thermal conduction with said coil. The translational movement of the magnetizable substance generates cold that is transmitted to the helium through the intermediary of conductive elements.

French Publication No. FR-A-2.525.748 has as its objective a magnetic refrigeration device comprising a magnetizable material, a system for generating a variable magnetic field, and a means for transferring heat and cold comprising a chamber filled with a saturated liquid refrigerant. The magnetizable material generates cold in a position wherein the cold transfer means extract cold from the magnetizable material by condensing a refrigerant, and the magnetizable material generates heat in another position wherein the heat transfer means extract heat from the magnetizable material by boiling another refrigerant.

French Publication No. FR-A-2.586.793 concerns a device comprising a substance which produces heat when it becomes magnetized and produces cold when it is demagnetized and a means for generating a variable magnetic field, said means for generating a magnetic field comprising a superconductive coil and a reservoir containing a cooling element.

These systems are extremely unreliable and are therefore not competitive with current refrigeration systems.

U.S. Pat. No. 3,108,444 describes a magneto-calorific refrigeration apparatus comprising a wheel composed of superconductive elements passing alternately through a hot circuit, a cold circuit, and a space subjected to a magnetic field. The object of this device is to generate extremely low temperatures, of the order of 4° Kelvin. This type of equipment is not adaptable for household use and does not function at ambient temperature or temperatures of about 0° Celsius.

U.S. Pat. No. 5,091,361 has as its object a heat pump using reverse magneto-calorific effect. The heat pump comprises a paramagnetic or ferromagnetic material alternately exposed to a very highly magnetized field. Such a system cannot be used for a domestic application, for example in a conventional refrigeration system running at temperatures approximating 0° Celsius.

DESCRIPTION OF THE INVENTION

The present invention proposes a cooling method and device to overcome the disadvantages of known systems, using no polluting liquid refrigerants and thus eliminating the drawbacks of prior art systems.

This goal is achieved by the method of the invention and characterized in that a first heat-transmitting fluid is circulated in a first circuit, called the hot circuit, connected to a first compartment of an enclosure containing a rotating element and a second heat-transmitting fluid in a second circuit, called the cold circuit, connected to a second compartment of said enclosure, said compartments being juxtaposed and separated by a partition, said enclosure being associated with a magnetic means to generate a magnetic field in said first compartment, at least in the area corresponding to said rotating element, and said rotating element comprising at least one magneto-calorific material which undergoes a temperature increase when it passes through said first compartment subjected to the magnetic field, and cools down when it passes through said second compartment that is not subjected to the magnetic field, in that heat is extracted from said first circuit using a first heat exchanger located in said circuit and connected to a heat utility circuit, and in that cold is extracted from said second circuit using a second heat exchanger located in said circuit and connected to a cold utility circuit.

Advantageously, the first and second heat-transmitting fluids circulate in the same direction or the reverse direction through the compartments in the enclosure.

Said first and second heat-transmitting fluids may be in either the liquid or gas state. These fluids may be suspensions, mud-like, currently called "slurry," or nanofluids, such as colloids or the like.

With this method the position of the magnetic elements is reversed relative to the compartments in the enclosure in order to arbitrarily generate cold and heat in one of said compartments.

This goal is also achieved by the device of the invention as defined in the preamble and characterized in that it comprises:

an enclosure divided into a first and a second compartment that are juxtaposed and separated by a partition, said enclosure containing a rotating element attached transversely in relation to the compartments and turning on an axle disposed within the plane of said partition, so that it is simultaneously partially inside said first and second compartments.

a first circuit called the hot circuit connected to said first compartment in said enclosure and comprising a first heat exchanger through which a first heat-transmitting fluid circulates, said first exchanger being connected to a heat utility circuit.

a second circuit called the cold circuit connected to said second compartment in said enclosure and comprising a second heat exchanger through which a second heat-transmitting fluid circulates, said second exchanger being connected to a cold utility circuit; and magnetic elements which generate a magnetic field in said first compartment in at least the area corresponding to said rotating element, said rotating element comprising at least one magneto-calorific material designed to undergo a temperature increase when it passes through the first compartment subjected to the magnetic field and to cool down when it passes through the second compartment not subjected to the magnetic field.

According to the preferred embodiment said magnetic elements may comprise permanent magnets, electromagnets or any other means for creating a magnetic field. They may also generate either a constant or a variable magnetic field.

The device may comprise complementary magnetic elements designed to create an insulating magnetic field insulating the second compartment from the magnetic field generated by said magnetic elements.

Advantageously, said magnetic elements are movable so they may be located in either a first position in which they generate a magnetic field in one of the compartments, or a second position in which they generate a magnetic field in the other of said compartments.

In one embodiment said magnetic elements comprise first electromagnets for the creation of a magnetic field in said first compartment, second electromagnets for the creation of a magnetic field in said second compartment, and a control means for the respective activation of the first or second electromagnets.

Preferably the first and second heat exchangers are selected from the group consisting of liquid-liquid, liquid-gas, and gas-gas heat exchangers.

In a preferred embodiment, the first circuit comprised a first pump and the second circuit comprises a second pump, the purpose of said pumps being to circulate the first and second heat-transmitting fluids, respectively, through each of these compartments.

In all the variations, a unit of passageways traverses the rotating element, said passageways being provided for the circulation of said first and second heat-transmitting fluids inside said rotating element.

According to a first embodiment, said rotating element may comprise a system of stacked discs made of different magneto-calorific materials, each disc comprising a unit of passageways communicating with the passageways of the adjacent disc or discs.

According to a second embodiment, said rotating element may comprise a system of nested hollow cylindrical elements made of different magneto-calorific materials, each cylindrical element being traversed by a system of passageways.

In a third embodiment, said rotating element comprises a system of nested angular sectors made of different magneto-calorific materials, said angular sectors being insulated from one another by thermal insulation elements, and each angular sector being traversed by a system of passageways.

Said rotating element may also consist of a single cylindrical element made of magneto-calorific material, said cylindrical element comprising a system of passageways opening onto both of its surfaces.

In one particular embodiment, said rotating element comprises walled angular sectors containing generally spherical grains consisting of at least one magneto-calorific material, said traversing passageways being defined by interstices formed between the grains.

The traversing passageways may be defined by an alveolar structure or by hollow tubes located along the axle of the rotating element.

In one particular embodiment, said traversing passageways are formed of a porous supporting structure with pores that are open and connected.

DESCRIPTIVE SUMMARY OF THE DRAWINGS

The advantages of the present invention will be more apparent from the following description of various embodiments of the invention with reference to the attached drawings, wherein.

Figure 1:
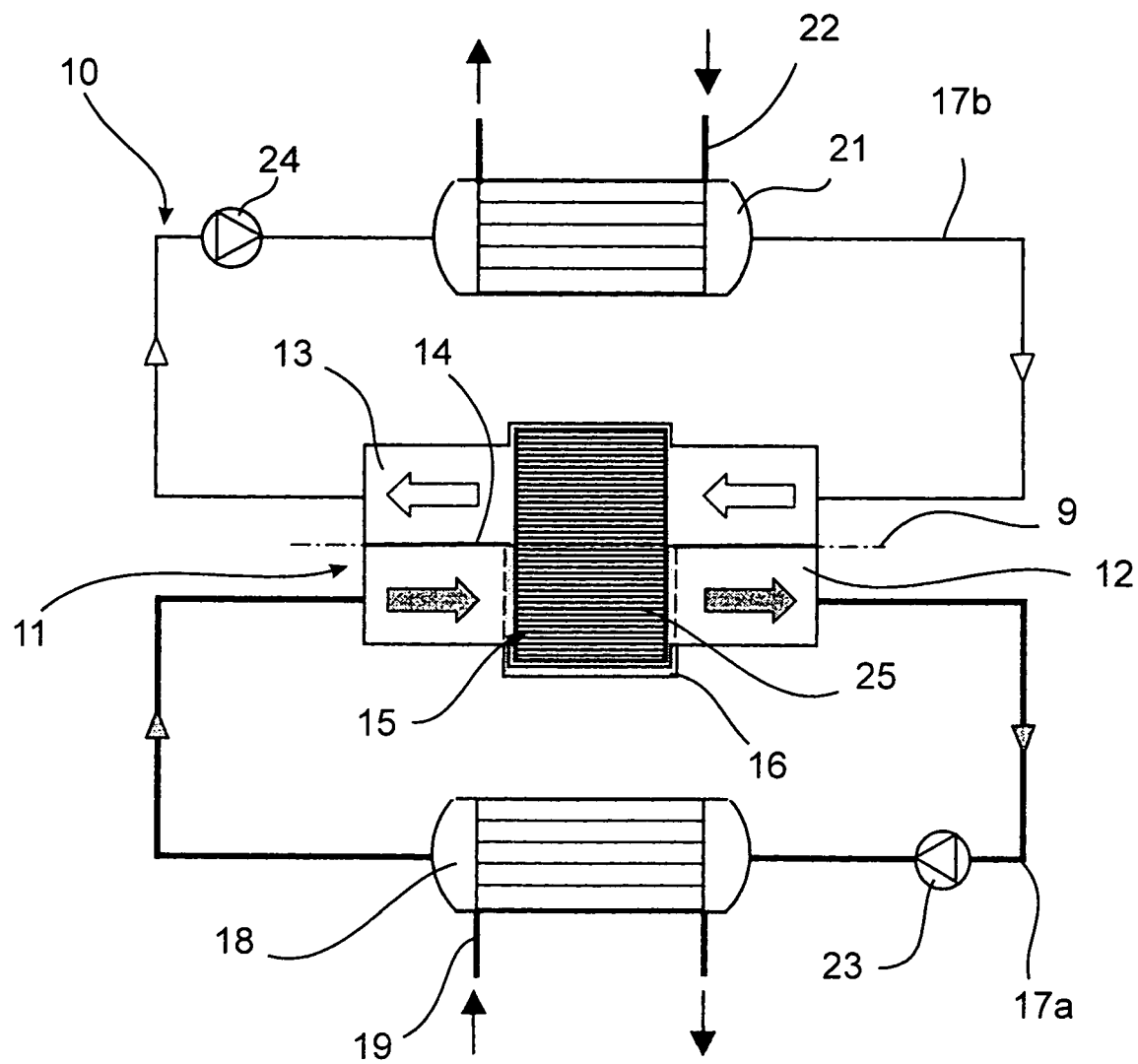
FIG. 1 is a schematic view of one advantageous embodiment of the device of the invention.
Figure 2A:
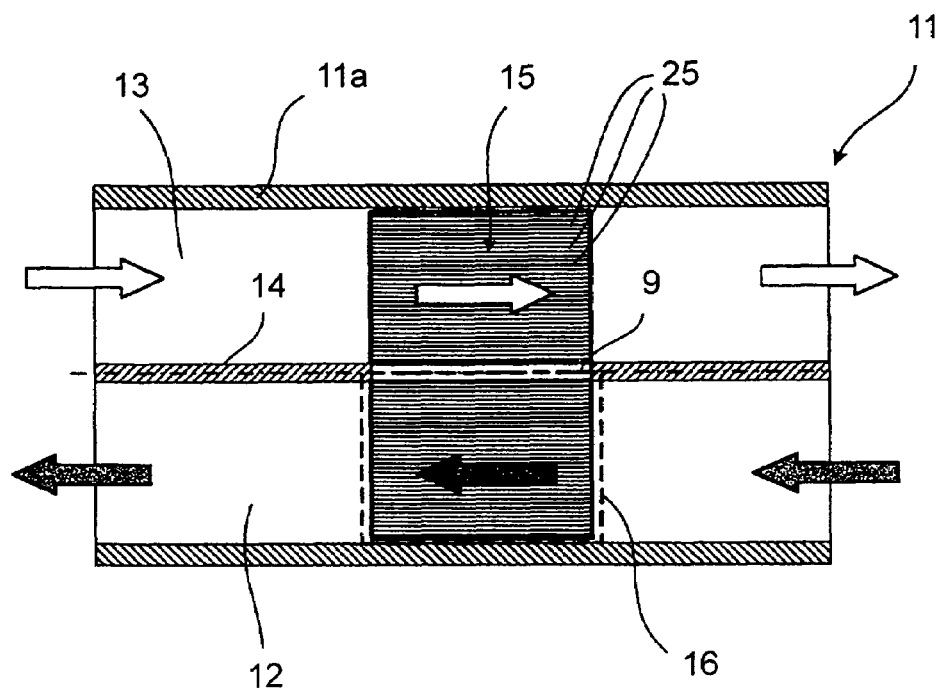
FIG. 2A is a longitudinal cross-section of a portion of the device of FIG. 1.
Figures 2B, 2C:
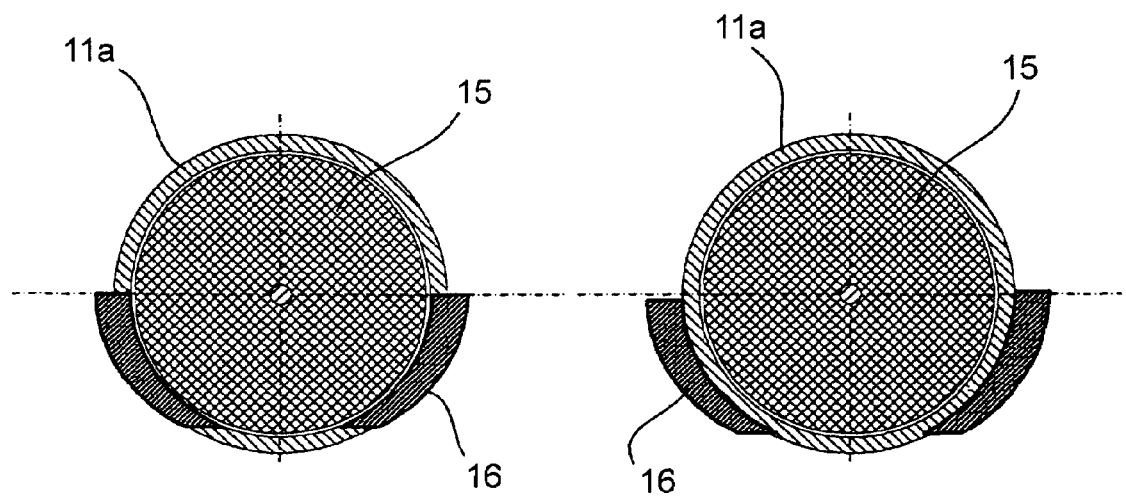
Figure 3A:
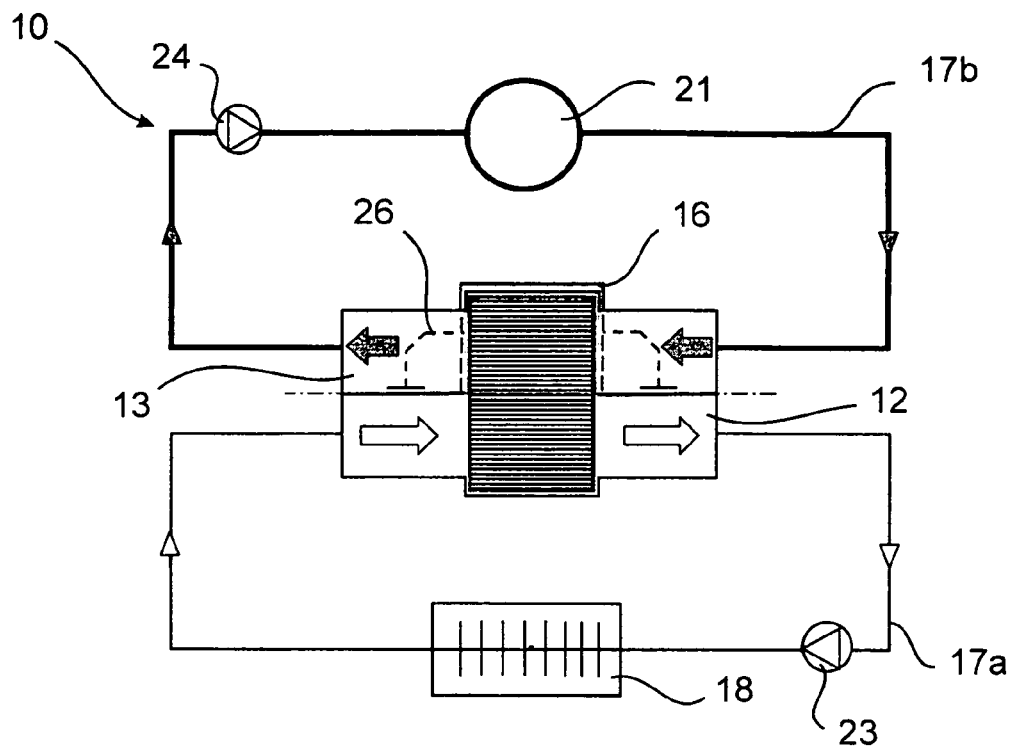
Figure 3B:
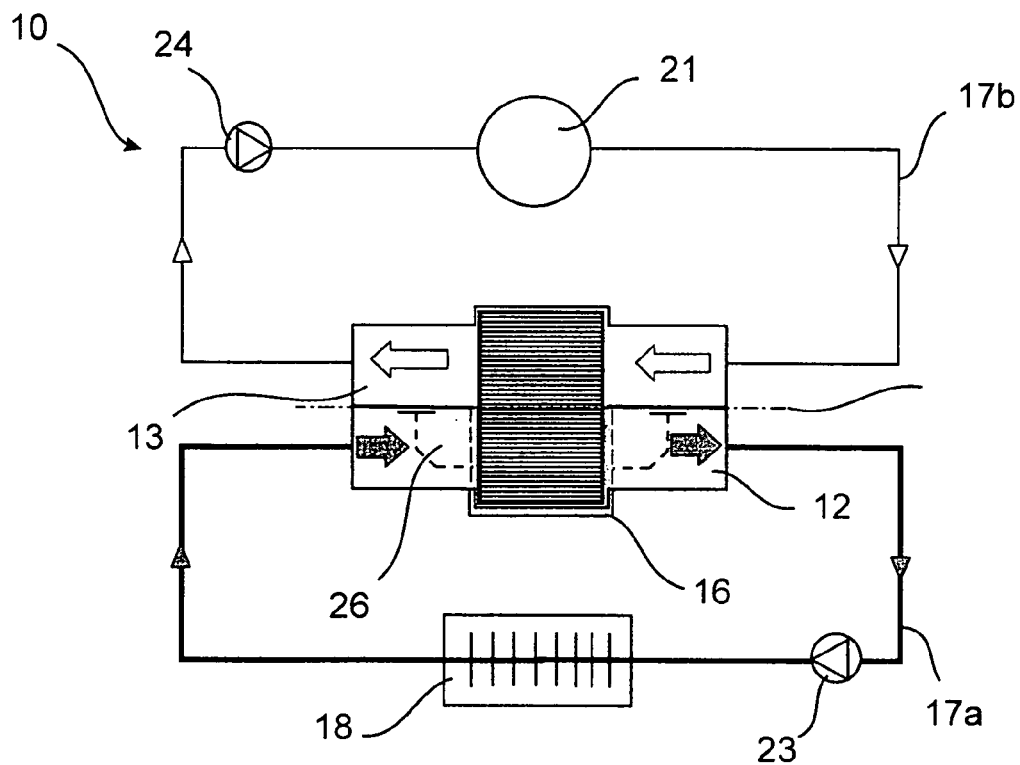
Figure 11:
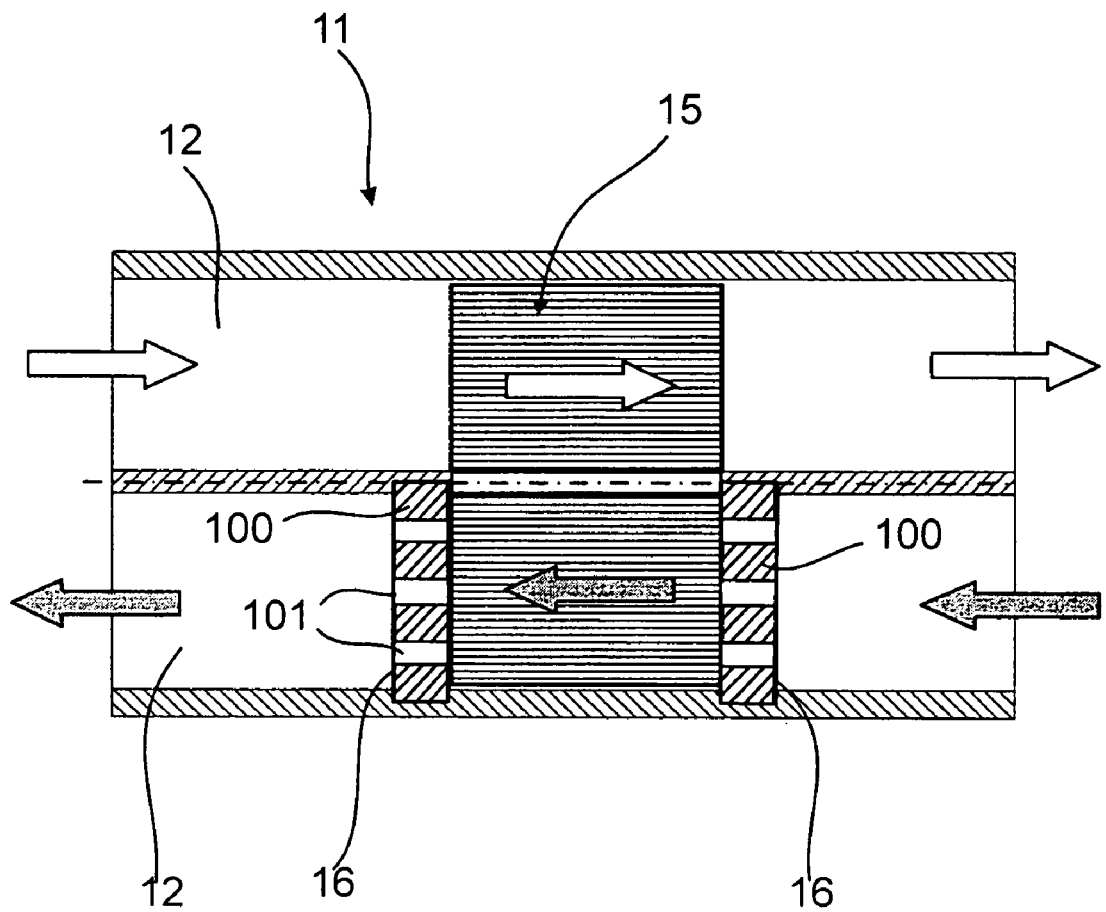
Figure 12:
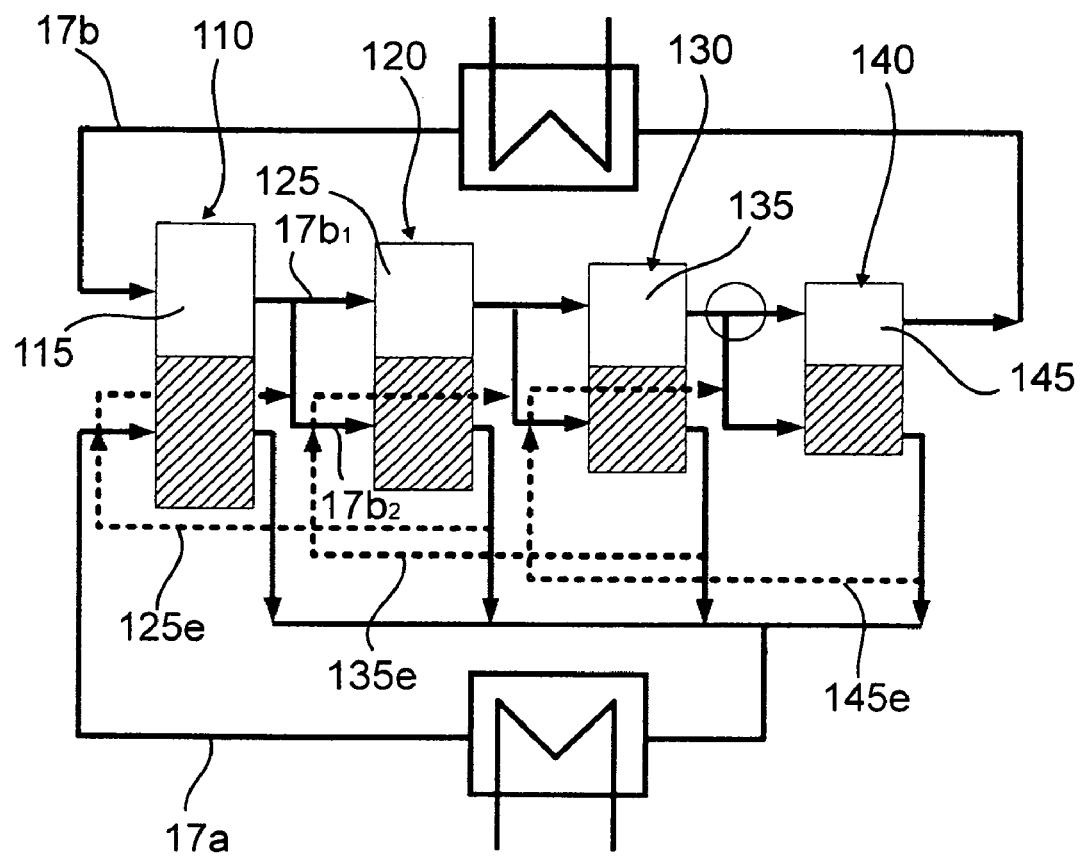

FIGS. 2B and 2C respectively illustrate transverse cross-sections of a portion of the device of FIG. 1;

FIGS. 3A and 3B respectively illustrate variations in embodiments of the device of the invention;

FIGS. 4 through 10 are axial cross-sections showing several embodiments of the rotating element of the device of the invention;

FIG. 11 is a schematic longitudinal cross-section depicting another embodiment of the device of the invention; and FIG. 12 is a schematic view depicting an installation consisting of several of the devices of the invention connected in a cascading arrangement.

HOW TO ACHIEVE THE INVENTION

With reference to FIG. 1, device 10 comprises an enclosure 11 comprising a first compartment 12 and a second compartment 13 that are juxtaposed and separated by a partition 14. This enclosure houses a rotating element 15 consisting of a wheel turning on an axle 9 located generally within the plane of said partition 14. A first circuit 17a, called the hot circuit, is connected to first compartment 12 of the enclosure and comprises a first heat exchanger 18, through which the heat-transmitting fluid circulates, said first exchanger 18 possibly being connected to a heat utility circuit 19 or simply designed to evacuate heat. A second circuit 17b, called the cold circuit, is connected to second compartment 13 in the enclosure and comprises a second heat exchanger 21 through which a second heat-transmitting fluid circulates and which may be connected to a cold utility circuit 22 or combined with a refrigerated enclosure. Device 10 is equipped with magnetic elements 16 to generate a magnetic field in first compartment 12, at least in the area corresponding to rotating element 15. A first pump 23 is connected to the first circuit 17a and circulates the first heat-transmitting fluid through said first circuit, and a second pump 24, connected to the second circuit 17b, circulates the second heat-transmitting fluid through said second circuit.

Rotating element 15 which consists, in this embodiment, of a single cylindrical element, is attached transversely in relation to the two compartments 12 and 13 so as to be simultaneously partially inside said first compartment 12 and said second compartment 13. This rotating element 15 consists at least partially of at least one magneto-calorific material and comprises traversing passageways 25 opening onto its two surfaces and allowing the two portions of each compartment 12 and 13 situated on either side of rotating element 15 to communicate with each other. Rotating element 15 is rotated by means of a suitable drive motor. It rotates at a slower speed than the speed at which the heat-transmitting fluids circulate in the two circuits and in traversing passageways 25. Because of this, only a very small portion of heat-transmitting fluid cooled in the portion of rotating element 15 that is outside the magnetic field penetrates the area subjected to the magnetic field, and vice-versa. The "loss" due to the transfer of fluid from one circuit to another by means of the rotating element is infinitesimal.

FIGS. 2A, 2B and 2C illustrate in more detail the positioning of magnetic elements 16. Enclosure 11 is provided with a partition 11a and comprises a central wall 14 that serves to define the two compartments 12 and 13 made of thermally insulating material, located in the median plane of enclosure 11. This wall 14 is discontinuous and located in the plane of the rotation axle 9 of rotating element 15. Each extremity of the two compartments 12 and 13 is open for connection to a conduit on the corresponding circuit of heat-conducting fluid. Magnetic elements 16, which may consist of either permanent magnets or electromagnets, are located on either side of rotating element 15, which is situated in first compartment 12. For this reason, these magnetic elements 16 are preferably located below and in abutment with the median plane passing through wall 14.

Rotating element 15 is coaxially connected inside enclosure 11 to axle 9 passing through the median plane separating the two compartments 12 and 13. This axle 9 is disposed to allow rotating element 15 to rotate using a drive motor (not shown). The diameter of rotating element 15 and the interior diameter of enclosure 11 are defined so that the two organs are separated by only a small space. This limits the volume of heat-transmitting fluid that can flow through this space while device 10 is operating. To accomplish this, rotating element may have on its periphery a seal, such as a gasket. Gaskets may also be placed on the interior edges of partition 14 to seal the two compartments 12 and 13. Traversing passageways 25 in rotating element 15 open at their extremities onto each surface of element 15 so that its passageways communicate with each of the two portions of each compartment 12, 13 situated on either side of said rotating element 15. These passageways 25 may be defined by an alveolar structure such as a honeycomb, or formed of hollow tubes parallel to axle 9 of rotating element 15. They may also be defined by a porous structure made of the material of rotating element 15.

FIGS. 2B and 2C show different constructions for device 10. Magnetic elements 16 are either integral with wall 11a, as shown in FIG. 2B, or located outside this wall, as shown in FIG. 2C.

The operation of device 10 is based on the method wherein rotating element 15, having been caused to rotate by means of a drive motor (not shown), the portion of said rotating element 15 situated in the magnetic field generated by magnetic elements 16 loses its entropy as it undergoes a temperature increase. At the same time the first heat-transmitting fluid in circuit 17a, put into motion by first pump 23 and circulating in the opposite direction from the second heat-transmitting fluid in second circuit 17b, enters the first compartment 12 at a given temperature $T_{c1}$ and through the intermediary of traversing passageways 25, crosses the portion of rotating element 15 subjected to the increase in temperature. The first heat-transmitting fluid in this portion of rotating element 15 undergoes a temperature increase due to heat transfer. At the outlet of first compartment 12, the temperature $T_{c2}$ of said heat-transmitting fluid is then higher than $T_{c1}$. The heat-transmitting fluid from heat utility circuit 19 enters first heat exchanger 18 at a temperature $T_{cs1}$ and in turn undergoes a temperature increase due to heat exchange with the first heat-transmitting fluid that has traversed enclosure 11 and has been heated by passing through compartment 12. The fluid from heat utility circuit 19 leaves said first heat exchanger 18 at a temperature $T_{cs2}$ that is higher than temperature $T_{cs1}$. The heat stored in this heat-transmitting fluid can be used for any application. It can also be simply evacuated into the ambient atmosphere.

While a first portion of rotating element 15 is subjected to rotation and undergoes a temperature increase when passing through the magnetic field generated by magnetic elements 16, a second portion of rotating element 15 situated outside said magnetic field becomes demagnetized as it cools. When said first portion leaves the magnetic field due to rotation by the rotating element as it becomes demagnetized and cools, this second portion is in turn exposed to the magnetic field, loses its entropy, and undergoes a temperature increase. The portion previously subjected to a temperature increase leaves the magnetic field generated by magnetic elements 16 and becomes demagnetized as it cools down to a given temperature. At the same time, the second heat-transmitting fluid circulating in second circuit 17b called the cold circuit, which is circulated by second pump 24, enters second compartment 13 at a given temperature $T_{f1}$ and by means of traversing passageways 25 in rotating element 15, crosses said portion of the element that is subjected to cooling. Said second heat-transmitting fluid undergoes cooling in this portion of rotating element 15 and leaves compartment 13 at a temperature $T_{f2}$ that is lower than temperature $T_{f1}$. Additionally, the fluid in cold utility circuit 22 enters second heat exchanger 21 at temperature $T_{fs1}$ and in turn undergoes cooling by means of heat exchange with the second heat-transmitting fluid which has traversed enclosure 11 and cooled down due to its passage through compartment 13. This fluid leaves said second heat exchanger 21 at a temperature $T_{fs2}$ that is lower than temperature $T_{fs1}$ destined for some purpose. The cold stored in this fluid can be used in any cold application whatsoever, particularly for cooling a cold storage unit, an air conditioning circuit, or the like.

The rotation of rotating element 15 alternately renews this operating cycle by generating heat in first heat exchanger 18 and cold in second heat exchanger 21. To obtain continuous operation, rotating element 15 is driven at a rotation speed defined by the application as well as the amplitude of the magnetic field and the flow of heat-transmitting fluid traversing said rotating element 15.

First heat-transmitting fluid circulating in first circuit 17a and second heat-transmitting fluid circulating in second circuit 17b may be different or identical. Additionally, they may be either liquid, gas, or in some other state depending upon the application. Furthermore, the fluids circulating in heat and cold utility circuits 19 and 22 may be either gas or liquid, depending upon the application. For this reason heat exchangers 18 and 21 in device 10 may be any known type depending upon the state of the heat-transmitting fluid. They may be either liquid-liquid, liquid-gas, or gas-gas type heat exchangers. Instead of each of these exchangers 18 and 21, any type of device that generates cold or heat, respectively, may be used, such, for example as a radiator, a heat pump, a refrigerator, or an air conditioning unit. It is also possible to circulate the fluid from heat utility circuit 19 through hot circuit 17a in place of the first heat-transmitting fluid to be heated directly in the hot portion of rotating element 15, and to circulate the fluid from cold utility circuit 22 through cold circuit 17b in place of the second heat-transmitting fluid to be cooled directly in the cold portion of rotating element 15. In this case the device does not comprise any heat exchangers.

FIGS. 3A and 3B are schematic representations of a variation of the device of FIG. 1. This device differs from device 10 of FIG. 1 in that it comprises movable magnetic elements 16 which, when placed in a first position $P_1$, that is, integral with compartment 13 (FIG. 3A) or in a second position $P_2$, that is, integral with compartment 12 (FIG. 3B), allow the reversal of cold- and heat-generating circuits at will. The two positions $P_1$ and $P_2$ are symmetrical with each other relative to the plane of partition 14. In this variation, magnetic elements 16 are equipped with attachment means 26, such as a U-shaped axle, which can be made to pivot 180° or to move translationally by a control means known in the art and change from one position to the other. In this way a circuit generating cold when magnetic elements 16 are in position $P_1$ generates heat when these magnetic elements 16 are placed in position $P_2$, and a circuit generating heat when magnetic elements 16 are in position $P_1$ generates cold when these magnetic elements 16 are placed in position $P_2$.

When magnetic elements 16 are placed in position $P_1$, the portion of rotating element 15 subjected to a temperature increase due to the magnetic effect is situated in second compartment 13. The first heat-transmitting fluid circulating in second circuit 17b becomes heated. Heat exchanger 21 then functions as a heat source and delivers heat to any fluid passing through it. At the same time, the portion of rotating element 15 that becomes demagnetized by cooling is situated in first compartment 12. The first heat-transmitting fluid circulating in first circuit 17a cools. Heat exchanger 18 then functions as a cold-generating source and can deliver cold at its outlet.

Conversely, when magnetic elements 16 are placed in position $P_2$, for example, by pivoting 180°, the portion of rotating element 15 that becomes demagnetized by cooling is situated in second compartment 13. The second heat-transmitting fluid circulating in second circuit 17b cools down. The heat exchanger then functions as a cold-generating source and delivers cold to any fluid passing through it. However, at the same time, the portion of rotating element 15 that is subjected to a temperature increase due to magnetic effect is situated in first compartment 12. The first heat-transmitting fluid circulating in first circuit 17a heats up. Heat exchanger 18 then functions as a source of heat and can deliver heat at its outlet.

When magnetic elements 16 are electromagnets, the same magnetic elements 16 attached for generating a magnetic field in first compartment 12 can also be attached in double and symmetrical relative to the plane separating the two compartments 12 and 13 in order to generate a magnetic field in second compartment 13. These magnetic elements 16 can be separately activated by a single control that generates a magnetic field in one or the other of compartments 12 or 13 depending upon the position of the control. It is also possible to provide magnetic elements that generate a variable magnetic field in order to vary the temperatures of the heat-transmitting fluids passing through it.

FIGS. 4 through 10 are schematic illustrations of variations of rotating element 15 of the device of the invention.

Figures 4, 5:
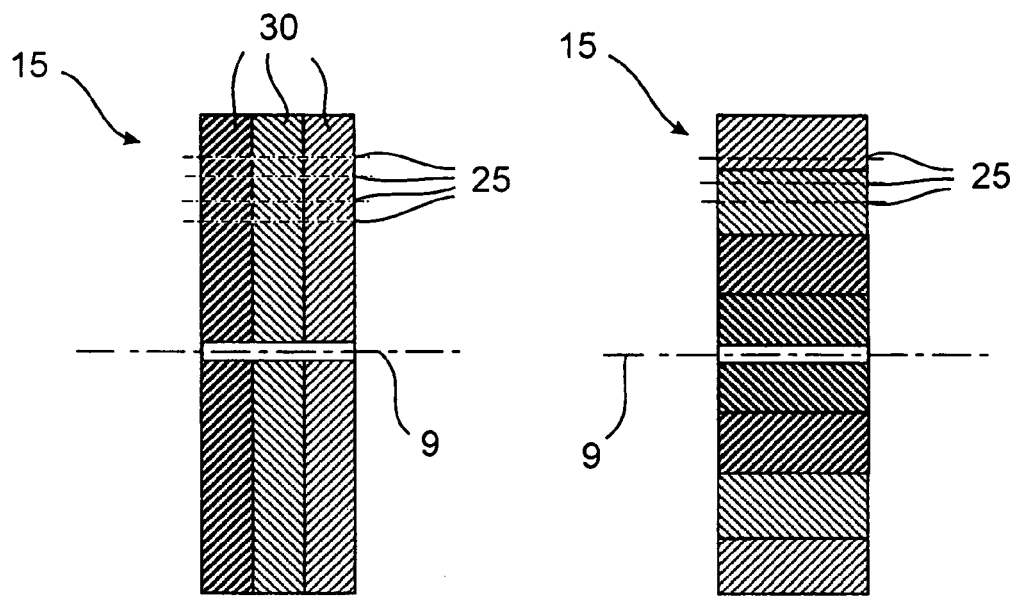

In the form of embodiment shown in FIG. 4, rotating element 15 consists of several coaxially connected discs 30. These discs are the same diameter and may be of the same thickness or different thicknesses. They are either attached at their surface or joined by any other suitable method. Each disc comprises a unit of traversing passageways 25 that communicate with the passageways in the adjacent disc or discs to open onto each surface of rotating element 15 thus formed. Each disc consists of a different magneto-calorific material. The number of discs depends on the number of magneto-calorific materials necessary to constitute rotating element 15. These materials are defined according to the application of cold-generation and heat-generation device 10. For a given application, the magneto-calorific materials are selected according to their Curie temperatures. These temperatures actually correspond to certain parameters required to attain the temperatures necessary for the application. Magneto-calorific materials with a Curie temperature ranging from 0° C. to −5° C., for example, are suitable for air conditioning applications; those with a Curie temperature ranging from 40° C. to 70° C., and preferably magneto-calorific materials with a Curie temperature of approximately 60° C., are suitable for heating applications; and magneto-calorific materials with a Curie temperature ranging from −10° C. to 70° C. are suitable for energy storage.

In the form of embodiment shown in FIG. 5, rotating element 15 consists of several hollow cylindrical elements 40, each made of a different magneto-calorific material and connected concentrically. These cylindrical elements are the same height and their interior and exterior diameters are defined so that each element overlaps the adjacent element. The exterior diameter of the largest hollow cylindrical element 40 constitutes the diameter of the resulting rotating element and the hole inside the smallest hollow cylindrical element corresponds to the bore passageway for axle 9 to which rotating element 15 is attached. Traversing passageways 25 are formed in the mass of each cylinder.

Figures 6, 7:
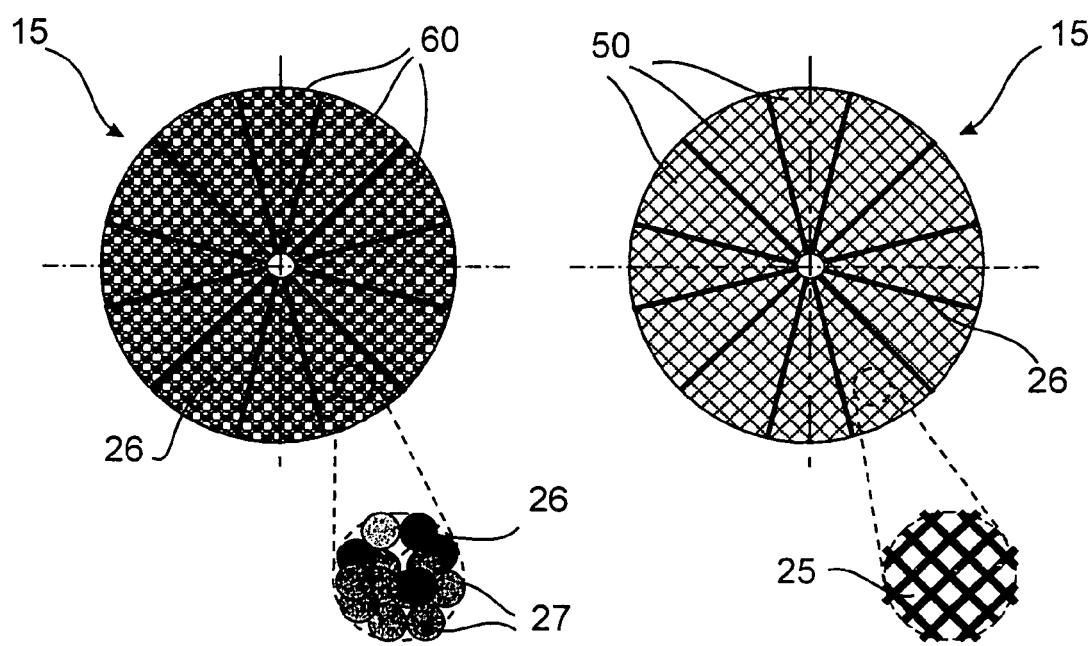

Rotating element 15, shown in FIG. 6, consists of several angular sectors 50 each made of a different magneto-calorific material. These elements, all with equal angles at the top, have the same radius and are the same height as rotating element 15. Each sector 50 comprises traversing passageways 25 that may be obtained by using a fine grid structure. Thermally insulating elements 26 may be attached between the different sectors for improved insulation between the portion of rotating element 15 that undergoes cooling and the portion that undergoes a temperature increase. The reason for this is to increase the efficiency of the device of the invention by preventing the escape of the cold and heat it respectively generates.

In the form of embodiment shown in FIG. 7, rotating element 15 consists of cavities 60 filled with grains 27 of a magnetic-calorific material. These cavities may take the form of angular sectors separated by thermally insulating elements 26. Traversing passageways 25 are defined by the interstices formed between grains 27. These interstices communicate with one another to open onto the two surfaces of rotating element 15. These two surfaces are covered by a thin wall (not shown) of mesh with openings smaller than the smallest of grains 27. This wall is not necessary if grains 27 are assembled with a connector. Grains 27 may be any shape and size. Their average size preferably ranges from 0.4 mm to 0.9 mm. They may be the same size and shape or different shapes and sizes. They may also consist of the same magneto-calorific material or different magneto-calorific materials. Each cavity may contain grains of the same magneto-calorific material, with the materials varying from one cavity to another, or a mixture of grains of different magneto-calorific materials, with the mixtures also varying from one cavity to another. It is very obvious that discs 30 and hollow elements 40 in the previously described embodiments could also consist of cavities filled with grains 27.

Figure 8:
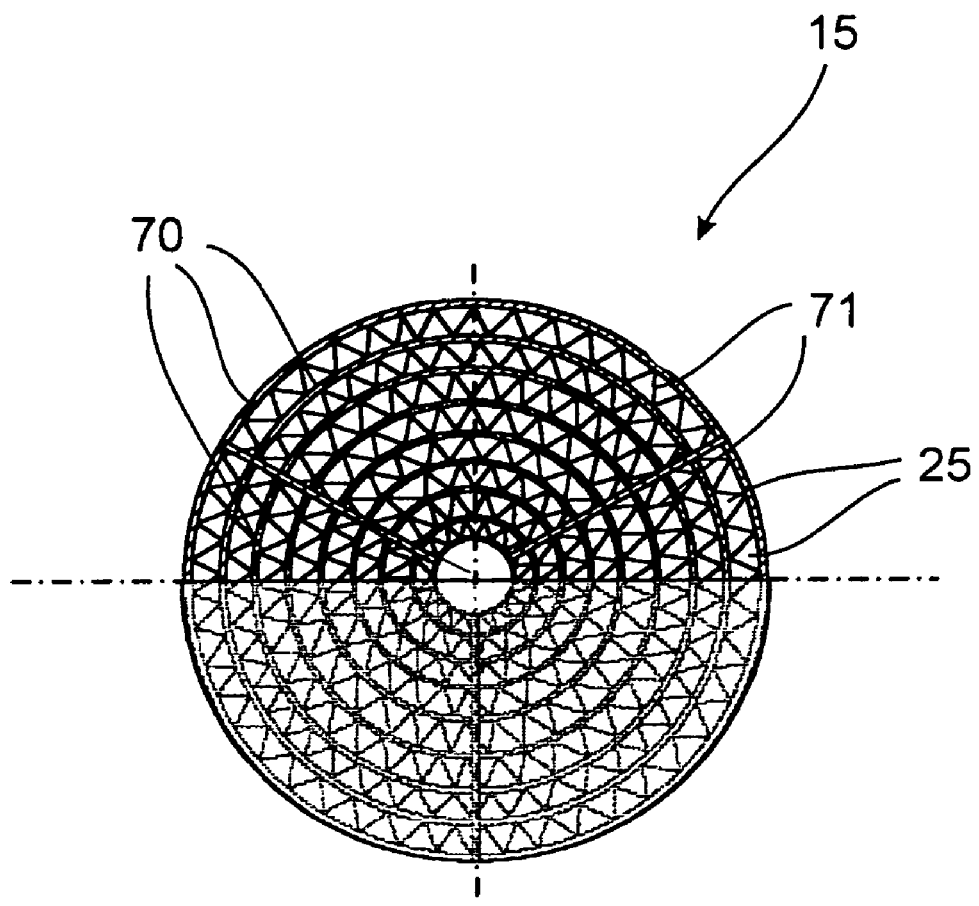

In the embodiment illustrated in FIG. 8, rotating element 15 is composed of a unit of coaxial tubular elements 70 that are spaced apart, with the spaces containing a pleated structure 71 that defines a multitude of traversing passageways. This structure may be made of a magneto-calorific material or it may serve as a support for such materials.

Figure 9:
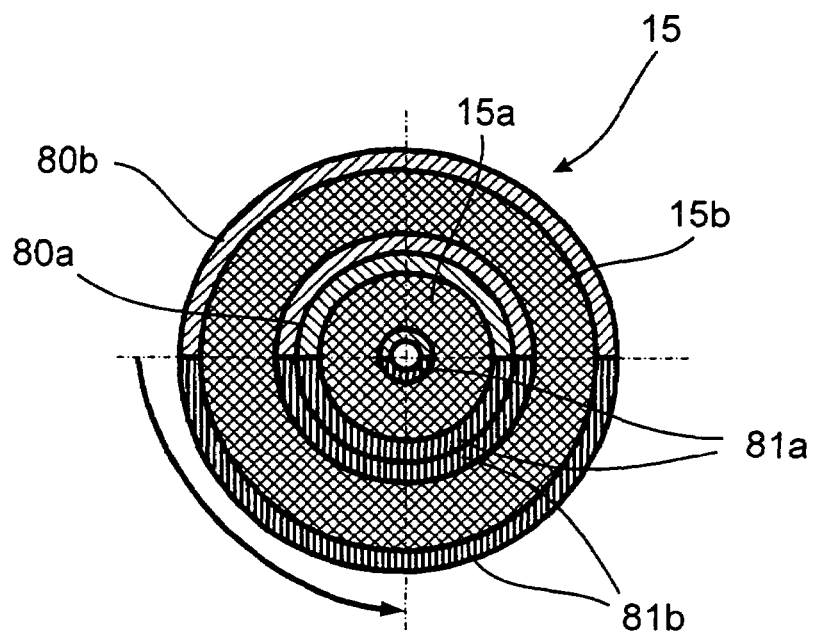

FIG. 9 shows another form of embodiment wherein rotating element 15 comprises an interior annular element 15a and an exterior annular element 15b that are coaxial. The enclosure is defined by an interior channel 80a disposed between the two elements and by an exterior channel 80b formed on the periphery of element 15b. The magnetic elements consist of a pair of interior magnets 81a cooperating with interior element 15a and a pair of exterior magnets 81b cooperating with exterior element 15b. This arrangement improves penetration by the magnetic field and its action on the magneto-calorific materials, thereby increasing the effectiveness of the device.

Figure 10:
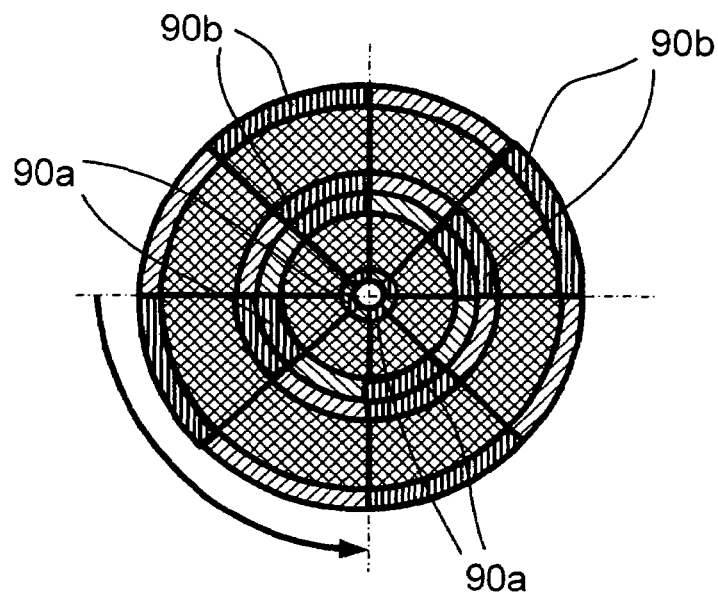

Another form of embodiment is shown in FIG. 10. The magnetic elements consist of angular segments, interior angular segments 90a and exterior angular segments 90b, respectively. The magnetic field is not limited to a semicircular sector, but is localized in angular sectors all around the rotating element.

FIG. 11 illustrates a variation in which the magnetic elements are housed in enclosure 11, more specifically, inside first compartment 12. They consist of at least one pair of magnets 100 equipped with orifices 101 for the passage of heat-transmitting fluid.

FIG. 12 is a schematic representation of a complex arrangement consisting of a unit of devices of the invention connected in a cascade. In the example shown this arrangement comprises four devices 110, 120, 130 and 140, each respectively comprising rotating elements 115, 125, 135 and 145 made of magneto-calorific material. The heat-transmitting fluid in the cold circuit 17b is moved to the cold inlet of rotating element 115 and then at the outlet of this element, it is broken down into two streams: $17b_1$, which is moved to the cold inlet of the second rotating element 125, and $17b_2$ which is moved to the hot inlet of the second rotating element 125. The same steps occur with all the other rotating elements. However, the reverse circulation may be produced when the appropriate temperatures are attained. It is shown by the dotted arrows 125e, 135e and 145e.

Such an arrangement improves the efficiency of the device considerably and increases the thermal output of a cold-generation installation using the magnetic-calorific effect.

The invention clamed is:

1. A device for generating cold and heat by a magneto-calorific effect, wherein the device comprises:
   an enclosure (11) divided into first and second compartments (12, 13) that are juxtaposed and separated from one another by a partition (14), the enclosure (11) comprises a cylindrical portion closely accommodating a rotating element (15) which comprises cylindrical shaped wheel that is arranged transversely in relation to the first and second compartments (12, 13) and rotating on an axle located in a plane of the partition (14) so that the rotating element (15) is simultaneously located partially inside the first and second compartments (12, 13), the rotating element is coaxial with the cylindrical portion of the enclosure (11) so that the fluid flows axially through the cylindrical rotating element (15);
   a first hot circuit (17a) connected to the first compartment (12) of the enclosure (11) and comprising a first heat exchanger (18) through which a first heat-transmitting fluid circulates, and the first exchanger being connected to a heat utility circuit (19);
   a second cold circuit (17b) connected to the second compartment (13) of the enclosure (11) and comprising a second heat exchanger (21) through which a second heat-transmitting fluid circulates, and the second exchanger being connected to a cold utility circuit (22); and
   magnetic elements (16) for generating a magnetic field in the first compartment (12), at least in the area corresponding to the rotating element (15), the rotating element (15) comprising at least one magneto-calorific material which undergoes a temperature increase when the rotating element (15) passes through the first compartment (12) subjected to the magnetic field and cools down when the rotating element (15) passes through the second compartment (13) that is not subjected to the magnetic field.

2. The device according to claim 1 wherein the magnetic elements (16) comprise permanent magnets.

3. The device according to claim 1 wherein the magnetic elements (16) comprise electromagnets.

4. The device according to claim 1 wherein the magnetic elements (16) generate a variable magnetic field.

5. The device according to claim 1 wherein the device comprises complementary magnetic elements (16a) to create an insulating magnetic field insulating the second compartment (13) from the magnetic field generated by the magnetic elements (16).

6. The device according to claim 1 wherein the magnetic elements (16) are movable so the magnetic elements (16) can be located either in a first position (P1) where the magnetic elements (16) generate a magnetic field in one of the first and second compartments (12, 13) or in a second position (P2) where the magnetic elements (16) generate a magnetic field in the other of the first and second compartments (12, 13).

7. The device according to claim 3 wherein the magnetic elements (16) comprise first electromagnets for creating a magnetic field in the first compartment (12), second electromagnets for creating a magnetic field in the second compartment (13) and control means for respectively actuating the first or the second electromagnets.

8. The device according to claim 1 wherein the first and second heat exchangers (18, 21) are selected from the group consisting of liquid to liquid, liquid to gas, and gas to gas heat exchangers.

9. The device according to claim 1 wherein the first hot circuit (17a) comprises a first pump (19), the second cold circuit (17b) comprises a second pump (22) and the first and second pumps make the first and the second heat-transmitting fluids circulate respectively through each of the first and second compartments (12, 13).

10. The device according to claim 1 wherein the rotating element (15) comprises a system of traversing passageways (25), and the traversing passageways (25) allows the first and second heat-transmitting fluids to circulate inside the rotating element.

11. The device according to claim 10 wherein the rotating element (15) comprises a unit of stacked discs (30) made of different magneto-calorific materials, each disc comprising a system of traversing passageways (25) communicating with the traversing passageways (25) in the adjacent disc or discs.

12. The device according to claim 10 wherein the rotating element (15) comprises a system of hollow overlapping cylindrical elements (40) made of different magneto-calorific materials, each cylindrical element (40) comprising a system of traversing passageways (25).

13. The device according to claim 10 wherein the rotating element (15) comprises a system of nested angular sectors (50) made of different magneto-calorific materials, and the angular sectors (50) being insulated from one another by thermally insulating elements (26), and each angular sector comprising a system of traversing passageways (25).

14. The device according to claim 10 wherein the rotating element (15) comprises a single cylindrical element made of magneto-calorific material, the cylindrical element comprising a system of traversing passageways (25) opening onto two surfaces.

15. The device according to claim 10 wherein the rotating element (15) comprises walled angular sectors (60) containing generally spherical grains (27) consisting of at least one magneto-calorific material, and the traversing passageways (25) are defined by interstices formed between the grains (27).

16. The device according to claim 10 wherein the traversing passageways (25) are formed of an alveolar structure.

17. The device according to claim 10 wherein the traversing passageways (25) are formed as hollow tubes disposed along the axle of the rotating element (15).

18. The device according to claim 10 wherein the traversing passageways (25) are formed as a porous structure.

19. A device for generating cold and heat by a magneto-calorific effect, wherein the device comprises:
- an enclosure (11) divided into first and second compartments (12, 13) that are juxtaposed and separated from one another by a partition (14), the enclosure (11) comprises a central cylindrical portion closely accommodating a rotating element (15) which comprises cylindrical shaped wheel that is arranged transversely in relation to the first and second compartments (12, 13) and rotating on an axle located in a plane of the partition (14)so that the rotating element (15) is simultaneously located partially inside the first and second compartments (12, 13), and the rotating element is coaxial with the central cylindrical portion of the enclosure (11) so that the fluid flows axially through the cylindrical rotating element (15);
- a first hot circuit (17a) connected to the first compartment (12) of the enclosure (11) and comprising a first heat exchanger (18) through which a first heat-transmitting fluid circulates, and the first exchanger being connected to a heat utility circuit (19);
- a second cold circuit (17b) connected to the second compartment (13) of the enclosure (11) and comprising a second heat exchanger (21) through which a second heat-transmitting fluid circulates, and the second exchanger being connected to a cold utility circuit (22); and
- magnetic elements (16) for generating a magnetic field in the first compartment (12), at least in the area corresponding to the rotating element (15), the rotating element (15) comprising at least one magneto-calorific material which undergoes a temperature increase when the rotating element (15) passes through the first compartment (12) subjected to the magnetic field and cools down when the rotating element (15) passes through the second compartment (13) that is not subjected to the magnetic field, and the magnetic elements (16) comprise permanent magnets which are fixed in a position and extend only along a half periphery of the central cylindrical portion of the enclosure (11).

20. A device for generating cold and heat by a magneto-calorific effect, the device comprising:
- an enclosure (11) being divided into first and second compartments (12, 13) that are juxtaposed and separated from one another by a partition (14), the enclosure (11) closely accommodating a cylindrical rotating element (15) arranged transversely in relation to the first and the second compartments (12, 13), the cylindrical rotating element (15) having a plurality of axially arranged traverse passageways (25) therein such that fluid passing through the first and the second compartments (12, 13) passes axially through the cylindrical rotating element (15) via the traverse passageways (25), the cylindrical rotating element (15) rotating on an axle which is coincident with a plane defined by the partition (14) so that the cylindrical rotating element (15) is simultaneously located partially inside the first and the second compartments (12, 13), and the rotating element is coaxial with at least a portion of the enclosure (11);
- a first hot circuit (17a) connected to the first compartment (12) of the enclosure (11) and comprising a first heat exchanger (18) through which a first heat-transmitting fluid circulates, and the first exchanger being connected to a heat utility circuit (19);
- a second cold circuit (17b) connected to the second compartment (13) of the enclosure (11) and comprising a second heat exchanger (21) through which a second heat-transmitting fluid circulates, and the second exchanger being connected to a cold utility circuit (22);
- magnetic elements (16) for generating a magnetic field in the first compartment (12), at least in the area corresponding to the cylindrical rotating element (15);
- the cylindrical rotating element (15) comprising at least one magneto-calorific material which undergoes a temperature increase when the cylindrical rotating element (15) passes through the first compartment (12) subjected to the magnetic field and cools down when the cylindrical rotating element (15) passes through the second compartment (13) that is not subjected to the magnetic field; and
- the magnetic elements (16) comprise permanent magnets which are fixed in a position only adjacent a periphery of the cylindrical rotating element (15) of only one of the first and the second compartments (12, 13).

* * * * *